United States Patent [19]

Tamaki et al.

[11] Patent Number: 4,860,461
[45] Date of Patent: Aug. 29, 1989

[54] COFFEE BEANS ROASTING DEVICE

[75] Inventors: Yoji Tamaki, Kagamigahara; Takuya Kino, Nagoya; Takashi Ito, Okazaki; Akihiko Nakamura, Nagoya, all of Japan

[73] Assignees: Pokka Corporation; NGK Insulators Ltd, Aichi, Japan

[21] Appl. No.: 177,353

[22] Filed: Apr. 1, 1988

[51] Int. Cl.⁴ ............................................. F26B 19/00
[52] U.S. Cl. .......................................... 34/68; 34/133; 34/39; 99/286
[58] Field of Search ................... 34/179, 181, 183, 68, 34/17, 133, 4, 39, 135–137; 99/286, 281, 287, 288, 468, 470, 474, 479

[56] References Cited

U.S. PATENT DOCUMENTS

| | | | |
|---|---|---|---|
| 4,048,473 | 9/1977 | Burkhart | 34/108 |
| 4,325,191 | 4/1982 | Kumagai et al. | 34/63 X |
| 4,691,447 | 9/1987 | Nakai et al. | 34/68 X |

*Primary Examiner*—Henry A. Bennet
*Attorney, Agent, or Firm*—Fred Philpitt

[57] ABSTRACT

The roasting body is composed of a roasting body, a rotary drum supported on the inside of the roasting body to rotate in a horizontal attitude to accommodate and stir the coffee beans, infrared heaters disposed on the inner wall surface of the roasting body to surround the rotary drum in order to heat the coffee beans accommodated in the rotary drum by radiant heat, and a circulating path to circulate the hot air in the rotary drum into the roasting body in order to utilize the thermal energy effectively.

4 Claims, 4 Drawing Sheets

F I G. 4
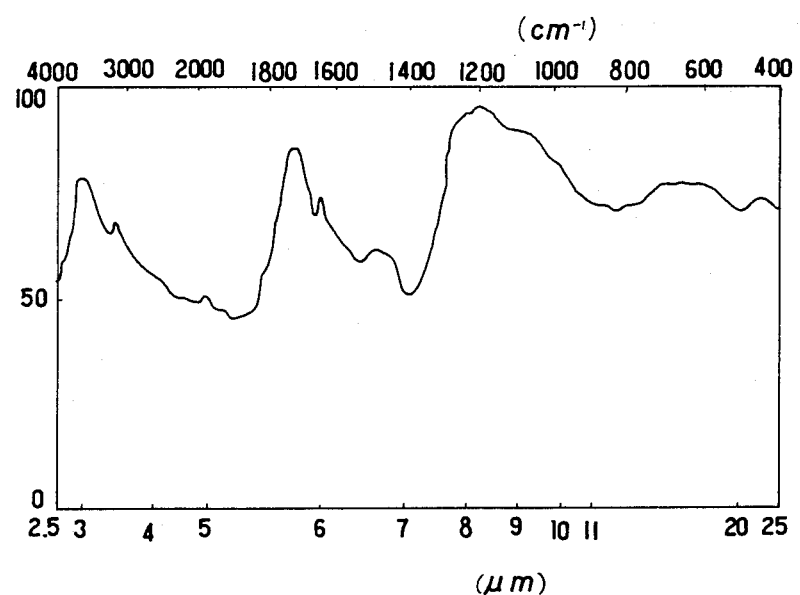
F I G. 5
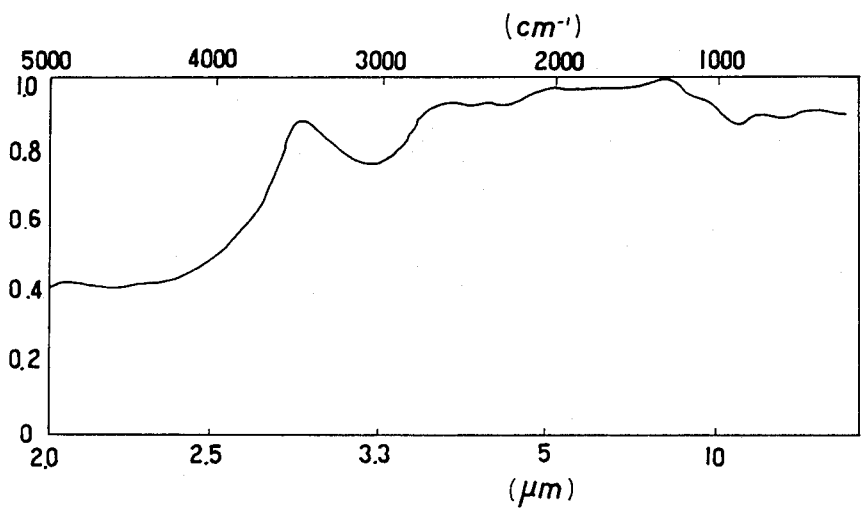

COFFEE BEANS ROASTING DEVICE

BACKGROUND OF THE INVENTION

This invention relates to a coffee beans roasting device, and more particularly to a coffee beans roasting device comprising a roasting body, a rotary drum supported inside of the roasting body to rotate in a horizontal attitude and accommodating the coffee beans and stirring it, infrared heaters disposed on an inner wall surface of the roasting body to surround the rotary drum to apply the radiant heat to the coffee beans in the rotary drum, and a mechanism for circulating a hot air of the rotary drum into the roasting body to utilize a heat energy effectively.

Heretofore, the systems of roasting the coffee beans are roughly classified to a gas heating system and a hot air system. The gas heating system is to expose the coffee beans directly to the heat source so that only the surfaces of the beans tend to scorch, and moreover the control of the roasting temperatures is difficult and irregular roasting occurs easily which are drawbacks. Also, the hot air system enables the roasting of the coffee beans uniformly as compared with the gas heating system but a large amount of hot air and relatively longer hours are required which increases the thermal energy cost and moreover, is the time consuming for the roasting which is not preferable in the mass production which are also drawbacks.

SUMMARY OF THE INVENTION

An object of this invention resides in that the coffee beans are thoroughly stirred and are exposed to the radiant heat from infrared heaters by the rotation of a rotary drum of a coffee beans roasting device, and as a result, the roasted coffee beans of an extremely high quality with excellent fragrance and taste and yet with long shelf life without change on standing can be provided on an account of the thorough penetration of the radiant heat not only to the surface but also to the inside of the coffee beans.

Another object of this invention resides in that roasted coffee beans of high quality can be obtained by a coffee beans roasting device in which spiral return vanes and feed vanes of a spiral opposite of said spiral and having a sheathing board on its part are provided inside of the rotary drum of the roasting device, and the coffee beans accommodated in the rotary drum are stirred and distributed uniformly in an axial direction which turns in the drum and reciprocates in the axial direction and the penetration of the radiant heat into the deep portion of the coffee beans becomes more positive and effective and the hot air in the rotary drum is stirred to blow off the steam appearing on the surface of the coffee beans with its hot air to accelerate the convection current heating.

A still other object of this invention resides in that a mechanism is provided for exhausting the hot air generated in the rotary drum of the coffee beans roasting device through an exhaust opening by circulating the part of the hot air in the roasting body to utilize the thermal energy effectively and to minimize the electric power consumption.

A further object of this invention resides in that a compressed air blowing tube provided on the coffee beans roasting device is provided toward the infrared heaters, whereby the compressed air is blown off every time the roasting of the coffee beans is completed to clean and eliminate the chafe accumulated on the radiant surface of the heater or the back surface of the heater or the bed in short time, and as a result, the radiation of the heaters is not deteriorated and also the lowering temperature in the roasting body does not occur and yet the inside of the roasting body is always kept clean.

BRIEF DESCRIPTION OF THE DRAWINGS

FIG. 4 is an infrared absorption spectrum of coffee beans; and

FIG. 5 is a drawing of spectral distribution of the infrared heaters.

DETAILED DESCRIPTION OF THE INVENTION

Figure 1:
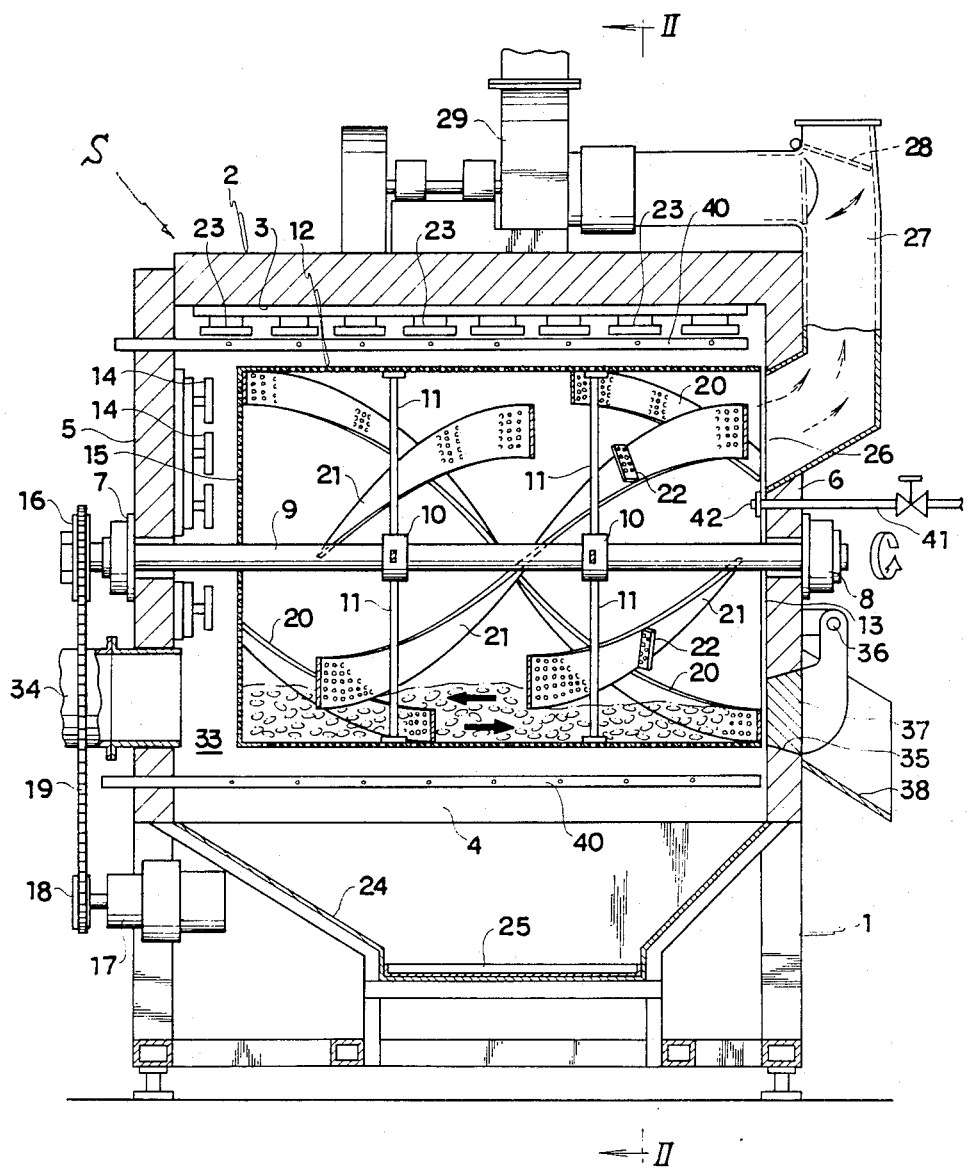
FIG. 1 is a longitudinal cross section of a coffee beans roasting device.
Figure 2:
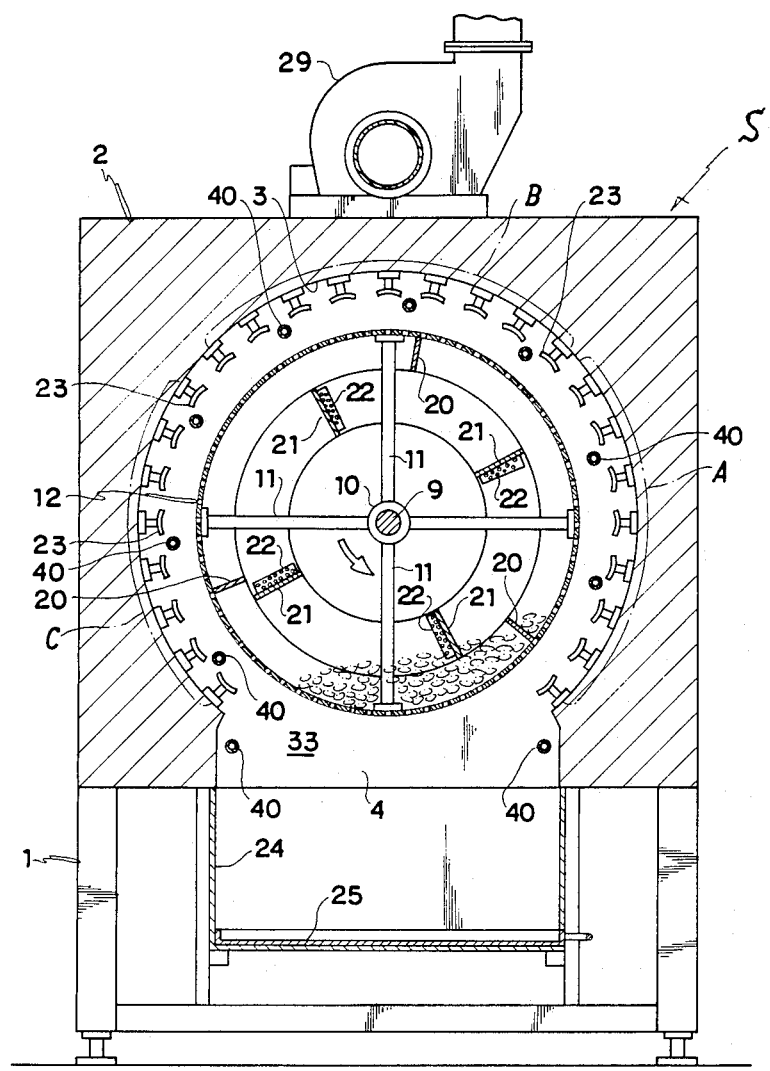
FIG. 2 is a cross section taken along a line II—II of FIG. 1.

A coffee beans roasting device according to this invention represented by a normal letter S is constructed as shown in FIG. 1 in which a roasting body 2 is supported on a frame 1, and the roasting body 2 is made of an insulating material, and its inner wall surface 3 is formed in a cylindrical shape, and its lower surface 4 opens and both end walls 5, 6 are formed in a perpendicular shape. Bearings 7, 8 are provided at central positions of said both end walls 5, 6, and a rotary shaft 9 is journalled horizontally on the bearings 7, 8, and a spoke 11 is formed radially from a boss 10 fixed to an outer periphery of the rotary shaft 9, and a rotary drum 12 is supported by the spoke 11. A rotary drum 12 is of a cylindrical form whose one end opens, and its opening end 13 is opposed in the proximity of the inner surface of the end wall of the roasting body as close as possible, and its gap is controlled to 1~2 mm to prevent falling of the coffee beans. The rotary drum 12 is formed of a so called punching metal, and a ratio of opening of numerous small holes (round holes) is 20~70%. By the way, the rotary drum 12 is perforated with numerous small holes on the end wall 15 in addition to the peripheral wall. One end of the rotary shaft 9 projects out of the roasting body from the end wall 5, and a sprocket 16 is fixed at its projected portion. A sprocket 18 provided on a motor 17 with a speed reducer fixed to the frame 1 and the sprocket 16 are connected by means of an endless chain 19. On the inner periphery of the rotary drum 12, three pieces of return vanes which are twisted in one direction spirally are fixed at an equal interval. Also, four pieces of feed vanes 21 which are twisted spirally in the opposite of said spiral of the return vanes 20, namely, in the opposite direction are fixed at an equal interval on the inner periphery of the return vanes 20. The return vanes 20 and the feed vanes 21 are perforated with numerous small holes made of punching metal, and its ratio opening becomes 20~70%. A small strip sheathing board 22 made of punching metal similarly is fixed to be projected from the part of the feed vanes 21 toward the opening end 13 of the rotary drum 12. By the way, the sheathing board 22 has an extremely small surface area as compared with a surface area of the rotary drum 12 which does not deteriorate the efficiency of radiation of the infrared heaters 23 and therefore, it may be merely a plate like material.

On the inner wall surface 3 of the roasting body 2, a plurality of infrared heaters 23 are disposed to surround the rotary drum 12. These infrared heaters 23 are similar to infrared heaters disclosed in official gazette of Japanese Utility Model Publication No. 50-3303, and said heater being prepared by burying a metal resistance heater such as Nichrome wire and the like in a ceramic made radiation plate having high heat resistance shock properties such as cordierite porcelain, zirconium porcelain, aluminous porcelain and the like, and each of said infrared heaters 23 is mounted on the inner wall surface of the roasting body by means of a frame made of stainless steel having excellent heat resistance. Each of said infrared heaters 23 is divided into a group A of 8 pieces×8 rows, a group B of 8 pieces×9 rows and a group C of 8 pieces×8 rows, and each group is connected to the electric power source, and electric energization is applied to each group. The infrared ray of wavelength 3~7 μm of high emissivity may be radiated from each of the infrared heater 23 by electric energization. Also, to one of the infrared heaters belonging to each group, a thermocouple for detection of temperature covered with a thermoelectromotive material such as known chromel-alumel wire and the like in insulation coating at its radiation surface side and this thermocouple is connected to a regulator performing the setting of temperature so that its heater temperature may be monitored. By the way, the infrared heater 23 is mounted to approach an outer periphery of the rotary drum 12 as close as possible, and its radiant heat may be radiated with efficiency in the rotary drum 12. Also, a plurality of infrared heaters 14 similar thereto are disposed on the inner surface of the end wall 5 and the radiant heat may be radiated into the drum through numerous small holes perforated on the end wall 15 of the rotary drum 12.

A funnel type hopper 24 is supported in the frame 1 in the lower part of a lower surface of the roasting body 2, and a tray 25 is detachably mounted on the bottom of the hopper 24.

Figure 3:
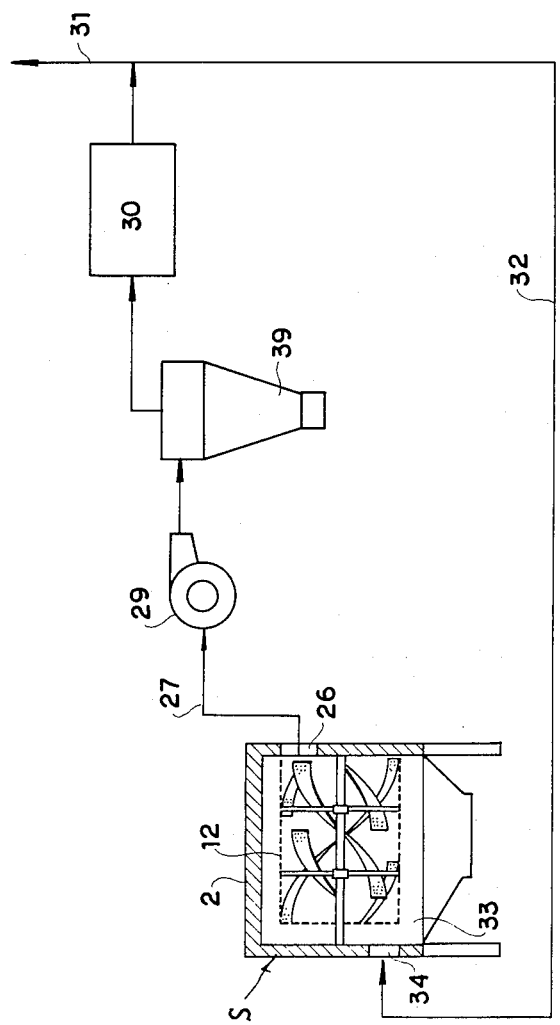
FIG. 3 is a drawing of a system of hot air circulation.

Also, reference numeral 26 denotes an exhaust opening doubling as a charge inlet of coffee beans which is formed at an end wall of the roasting body which is opposed to an opening end of the rotary drum 21, and on an upper end of a duct 27 communicated with the exhaust opening 26, a power drive shutter 28 is disposed which opens when the coffee beans are charged, and the duct 27 communicates with a suction side of a circulating fan 29 disposed on the roasting body 2. By the way, during the roasting of the coffee beans, the power drive shutter 28 is set in the upper part and an exhaust path from the exhaust opening 26 to the circulating fan 29 is formed A blow up side of the circulating fan 29, a cyclone type separator 39 and a filter 30 for deodorizing and defuming are connected as shown in FIG. 3. A secondary side of the filter 30 is branched to a waste smoke path 31 and a circulating path 32, and also, a tip of the waste smoke path 31 is communicated with a gap 33 in the roasting body 2 at the outside of the rotary drum 12.

Reference numeral 35 denotes an exhaust outlet that opens to the part of the end wall 6 of the roasting body 2 at a height being an identical level with a lower part of the rotary drum 21 and the exhaust outlet is mounted with a door 37 pivotal with a pin 36 to the outer surface of the end wall 6 of the roasting body which closes the exhaust outlet.

Reference numeral 38 denotes a coffee beans discharge guide conduit provided at the outside of the exhaust outlet 35.

Also, reference numeral 40 denotes a compressed air blow pipe disposed at an interval between the infrared heater 23 and the rotary drum 12, and the blow pipe is formed with a blow hole opposed to the infrared heater 23. Also, reference numeral 41 denotes a water supply pipe which runs through the end wall 6 and a blow nozzle 42 of the tip thereof is opposed in the rotary drum 12.

By the way, the small hole of the punching metal of the rotary drum 12 has a hole diameter of a degree not allowing the passing of the coffee beans, for example, 1~5 mm, and a rate of opening is properly selected in a range of 20~70% according to roasting conditions such of roasting, drum diameter, roasting temperature and the like. Also, in this embodiment, the rotary drum is formed by the punching metal, but for example, it may be integrally formed by ceramics. A ceramics or sintered material of a metal oxide may be pasted to an inner peripheral surface or an outer peripheral surface of the rotary drum made of the punching metal. The ceramics or the sintered material of the metal oxide has generally abrasion resistance which extends a service life of the rotary drum and the ceramics is sanitarily preferable because of no apprehension of mixing with metal powder. Moreover, the ceramics or the metal oxide sintered material has advantageous point of transmitting the radiant heat from the infrared heaters to the coffee beans with an efficiency since it has the high infrared absorption index.

In the coffee beans roasting device having the foregoing construction, the raw coffee beans are charged into the rotary drum 12 through the exhaust opening 26 by means of the duct 27 by opening the power drive shutter 28. The rotary drum 12 is rotated by the drive of the motor 17 at a low speed of about 40 rpm in a direction of the arrow mark by means of a chain 19. When the rotary drum is in rotation, the feed vanes 21 feed the coffee beans accommodated in the rotary drum 12 in the direction of the end wall 5 and the return vanes 20 feed the coffee beans in the direction of the end wall 6. By the foregoing pressure feeding, the coffee beans in the rotary drum revolve in the drum upon uniform stirring and distribution in the axial direction to move back and forth in the axial direction. At this time, the radiant heat from the infrared heater 23 is transmitted to the inside from the surface layer of the coffee beans upon transmission in the drum through numerous small holes perforated in the peripheral wall and end wall of the rotary drum and the feed vanes 21 and the return vanes 20. FIG. 4 shows the infrared absorption spectrum curve of the coffee beans,.and FIG. 5 shows the radiation index spectral distribution curve by the differential infrared radiation index measuring method of the infrared heater used therein. As will be obvious from FIG. 4, the infrared absorption index of the coffee beans shows a high value of more than 50% in almost all the wavelength, but particularly, it is found out that the infrared absorption index shows the peak at three points of the wavelength 3 μm, 5.7 μm and 8.3 μm. On the other hand, it is found out that the specific energy intensity of the infrared to be radiated from the infrared heater has its peak at about the wavelength 3 μm, 5~8 μm. From the foregoing measurement, it discloses that the infrared to be radiated from the infrared heater is absorbed by the coffee beans with an extremely high absorption index. By the way, the temperature of the infrared heater 23 is preferably set at a temperature of generally 400°~700° C. to be coincided with the infrared absorption spectrum of the coffee beans. The temperature of the infrared spectrum of the coffee beans. The temperature of the infrared heater 23 is detected by the thermocouple as described in the foregoing, and the temperature is automatically adjusted to a desired value by a temperature regulator.

The feed vanes 21 and the return vanes 20 stir the coffee beans in the rotary drum by the rotation of the rotary drum 12, and at the same time, the hot air in the rotary drum is stirred so that the steam appeared on the surface of the coffee beans by the heating is blown off by the hot air to accelerate the convection heating.

Furthermore, the hot air produced in the rotary drum 12 is drawn into the circulating fan 29 from the exhaust opening 26, and the thin skin (hereinafter referred to as chafe) of the coffee beans mixed in the hot air is separated by the cyclone type separator 39, and then, the deodorization and defuming are carried out to an extent of necessity of pollution control by the filter 30. The part of the hot air is discarded, and the other part is circulated in the gap 33 in the roasting body 2 through the circulating path 32. The hot air entering the gap in the roasting body 2 is sucked into the rotary drum 12 through the numerous small holes since the atmospheric pressure in the rotary drum is lower than the gap 33 in the roasting body 2 by the sucking action of the circulating fan 29. The difference of the atmospheric pressure between the rotary drum 12 and the outside of the roasting body 2 may be controlled by adjusting the rotation of the circulating fan 29, but the difference in the atmospheric pressure is arranged to be always maintained at minus 5~200 mm water column. Namely, in order to prevent the adhesion of the smoke odor to the coffee beans and to recover the chafe, the forced exhaustion of the inside of the rotary drum 12 is carried out through the exhaust opening 26 during the roasting, but if the exhaust is too weak, the smoke adheres to the oil and fat ingredient permeated from the coffee beans which keeps the smoke odor to some extent, and in case the exhaust is too strong, the fragrance is weak even though the smoke odor is removed, and the taste is lost which gives an adverse influence on the taste of the coffee beans so that the difference in the atmospheric pressure between the rotary drum 12 and the outside of the roasting body 2 is properly selected in a range of minus 5~200 mm water column by considering the foregoing factors.

When the desired roasting is completed, water is sprayed by a water supply pipe 41 into the rotary drum 42 to lower the temperature of the coffee beans rapidly to prevent the roasting from going too far, not more than needed. At this time, a large amount of steam is generated so that the amount of exhaust is increased by increasing the rotation of the circulating fan 29. In this case, it is desirable that the pressure in the roasting body is kept at about minus 150~200 mm water column to prevent the escape of the steam out of the roasting body. By the way, in order to make the roasting going too far, the whole or the part of the electric energization to the groups A, B, C of the infrared heaters 23 is stopped simultaneous with the spraying of the water.

When the door 37 is made to open and the revolutions of the rotary drum 12 is lowered to about 15 rpm, the coffee beans in the rotary drum 12 are fed to the exhaust outlet 35 by the action of the return vanes 20 and are sequentially discharged. By the way, the sheathing board 22 limits the feeding action of the coffee beans in the direction of the end wall 5 by the feed vanes 21 and to keep the discharge of the coffee beans after the roasting smooth in short time so that the advancement of the degree of roasting during the discharge is small.

The compressed air is blown off from the blow pipe 40 after the discharge of the coffee beans for short time of 2~10 seconds. By this operation, the chafe blown off by the centrifugal force of the drum which is burnt in the roasting body and is accumulated on the radiation surface of the heater and the back surface of the heater and on the bed of the roasting body is blown off and is forcedly discharged or is recovered by the tray 25 so that the accumulation of the chafe and the like on the heaters or the deterioration of the radiation of the heaters is not found. The amount of the air is small because of its operation is instant, and the temperature in the roasting body does not descend. If the blowing of the compressed air is carried out each time the roasting of the coffee beans is over, the inside of the roasting body may be kept always clean.

By the way, the door is made to open in order to discharge the coffee beans upon completion of the roasting, and then, the raw coffee beans to be roasted next are charged into the rotary drum 12 whereby the temperature in the rotary drum is rapidly lowered, but the residual heat in the circulating path 32 is supplied to the roasting body 2 by the operation of the circulating fan 24 so that the temperature of the rotary drum may be elevated again in short time.

An air introducing inlet 34 is desirably formed in the lower part of the roasting body 2 at the lower part of the end wall 5. When it is formed in the upper part thereof, it communicated with the exhaust opening 26 which prevents the sufficient temperature elevation in the rotary drum.

Also, the infrared heater 23 used herein has a resistance against moisture and is sanitary clean, and moreover, its calory is high and its resistance to lowering temperature is high so that the temperature descending speed of the heater itself is slow, and the margin of the fluctuation against the set temperature is small so that there is the advantage of uniform heating. By the way, the porcelain plate of the infrared heater may be of curve shape or flat shape as shown in the drawings.

Also, the atmospheric temperature in the roasting body during the roasting is desirably set at 350°-500° C. By setting it in the foregoing temperature range, the oil and fat ingredient to be permeated from the coffee beans is burnt so that the oil and fat ingredient is prevented from being adhered and accumulated on the rotary drum, and thus, the inside of the roasting body can be kept clean. By the way, in order to prevent the excessive high temperature in the roasting body, the power source of the group B of the infrared heaters 23 is interrupted, and the heating in the roasting body may be made by the infrared heaters of the groups A and C only.

Table 1 shows a comparison of the case of the conventional hot air roasting of four kinds of coffee beans of "Columbia spremo", "Guatemala EPW", "Brazil No. 2" and "Indonesia lobster" and the case of the roasting by the roasting device of this invention.

As will be obvious from the foregoing result, the well balanced coffee beans having less adverse points such as "dustiness", "smelling of mud", "thick or heavy", "offensive sour taste" and the like with respect to the taste by the roasting according to this invention can be obtained.

Also, with respect to the coffee beans of Brazil No. 2, the comparison was made between the roasted coffee beans according to this invention and the roasted coffee beans by the conventional hot air by a cup test (trial drinking) of the quality deterioration due to the shelf storage, and the result is shown in Table 2. As the result, the coffee beans by the hot air roasting produces offensive sour taste and dusty odor in the first day at the preservation temperature of 37° C. and on the second day onward, the deterioration is in progress. On the contrary, the infrared roasting produces less deterioration and has no offensive sour taste, astringency, dustiness and on the second day onward, a small change is recognized but the taste is still maintained, and such condition is maintained up to 10th day.

Table 3 is composed of 100 g of milk, and 65 g of sugar and 835 g of coffee extracted solution, and the black sugar added type coffee is composed of 65 g of sugar and 935 g of coffee extracted solution.

Accordingly, the coffee beans charged into the rotary drum are stirred by the rotation of the rotary drum. The coffee beans are subjected to the radiant heat by the infrared heaters disposed to surround the rotary drum. At this time the infrared penetrates into the deep structure of the coffee beans to heat the coffee beans uniformly into the inside. Also, with the roasting, the hot air in the rotary drum is arranged to circulate in the roasting body to utilize the thermal energy effectively.

What is claimed is:

1. A coffee bean roasting device comprising in combination
    a roasting chamber,
    a drum mounted for rotary movement within said roasting chamber and serving as a container for coffee beans during the roasting operation,
    heating means mounted interiorly of said roasting chamber, exteriorly of said drum,
    means to circulate hot air withdrawn from the roasting chamber back into the roasting chamber,
    (a) said roasting chamber
        (1) being insulated so as to retain heat within the interior of the chamber,
        (2) having side walls and first and second end walls, said end walls containing an inlet air opening and an outlet opening for heated gases and vapors,
        (3) the first end wall of the roasting chamber having openings for the introduction of fresh coffee beans to said drum and an outlet opening for removing roasted coffee beans discharged from said drum,
    (b) said rotary drum
        (1) having cylindrically-shaped side walls that contain numerous small openings,
        (2) being mounted for rotary movement about a horizontal axis,
        (3) having a first end that is open and a second end that is closed, and
        (4) said first open end being positioned closely adjacent to said first end wall of said roasting chamber and being sufficiently open to both receive fresh coffee beans and to discharge coffee beans after they are roasted,
    (c) said heating means comprising a plurality of infrared heaters mounted around the interior of said

TABLE 1

| roasting condition | Columbia spremo | Guatemala EPW | Brazil No. 2 | Indonesia lobster |
|---|---|---|---|---|
| conventional hot air roasting | strong astringent taste, not much sweet smell or moderate sour taste | grassy smelling and no pure taste | dusty and grassy taste | smelling of mud and strong astringent taste |
| roasting by device of this invention | astringent taste without peculiarity, with no bitter taste, and pure taste of coffee with proper sour taste with proper good body. fragrance is appropriate. | astringent taste without peculiarity, with no bitter taste, and pure taste with sour taste, and sweetness balanced taste coffee. fragrance is appropriate. | pure Brazilian taste and fragrance and bitter and sour taste balanced coffee. | pure and smooth taste. fragrance is appropriate. |

TABLE 2

| | lapsed time (days) | | | | | | |
|---|---|---|---|---|---|---|---|
| | 1 | 2 | 4 | 6 | 8 | 10 | 12 |
| conventional hot air roasting | ± | — — | — — | — — | — — | — — | — — |
| roasting by device of this invention | + | + | + | + | + | ± | — |

( +: good    ±: slightly good
  —: considerably  — —: completely deteriorated
       deteriorated )

conditions:
( preservation temperature: 37° C.
  judging method: cup test (test members 20 persons)
  Coffee beans in crushed condition are preserved in a craft paper bag. )

TABLE 3

| | milk contained type | black . sugar added type |
|---|---|---|
| conventional hot air roasting | 34 | 30 |
| roasting by device of this invention | 53 | 58 |

Furthermore, Table 3 shows the result of comparison of the liking between the roasting of this invention and the roasting by the conventional hot air with respect to the canned coffee. This Table 3 shows that inquiries are collected from 20 test drinkers, who were asked to mark orders of extremely good, good and poor, and the good and bad of the taste were represented by a total points with 3 points for extremely good, 2 points for good and 1 point for bad. Also, the milk contained type coffee in roasting chamber and disposed around more than half of the outer circumference of said drum, and (d) said means to control the movement of the coffee beans within said drum comprising at least one spirally shaped vane fixed to the interior surface of the drum and twisted in one direction so as to move coffee beans in one direction upon rotation of the drum, and at least one other drum spirally shaped vane fixed to the interior surface of the drum and twisted in the opposite direction so as to move coffee beans in the opposite direction upon rotation of the drum.

2. A coffee bean roasting device according to claim 1 in which a sheathing board is mounted on the part of the feed vane near the opening end of the rotary drum.

3. A coffee bean roasting device according to claim 2 which includes a blowing pipe for blowing compressed air toward the infrared heaters.

4. A coffee bean roasting device according to claim 2 which includes a circulating fan for keeping a difference of atmospheric pressure of minus 5–200 mm water column between the inside of the rotary drum and the outside of the roasting chamber.

* * * * *